(12) United States Patent
George et al.

(10) Patent No.: US 10,363,619 B2
(45) Date of Patent: Jul. 30, 2019

(54) RECIPROCATING SAW BLADE (71) Applicant: BLACK & DECKER INC., New Britain, CT (US)

(72) Inventors: Malek George, Shelbyville, KY (US); John P. Wells, Eminence, KY (US); David Brutscher, Simpsonville, KY (US); James R. Niblett, Ellicott City, MD (US); David N. Johnson, South Yorkshire (GB)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/163,758

(22) Filed: May 25, 2016

(65) Prior Publication Data

US 2017/0120356 A1 May 4, 2017

Related U.S. Application Data (60) Provisional application No. 62/249,585, filed on Nov. 2, 2015.

(51) Int. Cl.
*B23D 61/12* (2006.01)
*B23D 49/16* (2006.01)

(52) U.S. Cl.
CPC .......... *B23D 61/121* (2013.01); *B23D 49/16* (2013.01); *B23D 61/123* (2013.01)

(58) Field of Classification Search
CPC ............................. B23D 49/16; B23D 61/121
USPC ................... 83/835, 836, 846, 848
See application file for complete search history.

(56) References Cited

U.S. PATENT DOCUMENTS

| | | | |
|---|---|---|---|
| 603,128 | A | 4/1898 | Clemson |
| 3,292,674 | A | 12/1966 | Turner |
| 5,606,900 | A | 3/1997 | Stoddard |
| 7,036,415 | B2 | 5/2006 | Tsujimoto |
| 7,127,979 | B2 | 10/2006 | Kocher et al. |

(Continued)

FOREIGN PATENT DOCUMENTS

| | | |
|---|---|---|
| AT | 510911 A1 | 7/2012 |
| DE | 102012201364 A1 | 11/2012 |
| WO | 2005096949 A2 | 10/2005 |

OTHER PUBLICATIONS

Chariot, David—European Search Report re: EP16196736—Feb. 22, 2017—10 pages—The Hague.

(Continued)

Primary Examiner — Omar Flores Sanchez
(74) Attorney, Agent, or Firm — Scott B. Markow (57) ABSTRACT

A reciprocating saw blade for improving vibration and cordless runtime includes an elongated body having a front end portion and a rear end portion. An elongated cutting edge extends from the front end portion to the rear end portion and defines a longitudinal axis. An opposite non-cutting back edge extending from the front end portion to the rear end portion. The body has a thickness of approximately 0.89 mm to approximately 1.15 mm. A tang coupled to the rear end portion is configured to be coupled to a tool holder of a powered reciprocating saw. The cutting edge comprises a plurality of teeth and gullets. The teeth have a kerf width of approximately 1.29 mm to approximately 1.56 mm and are arranged in a pattern of alternating tooth pitch of a smaller first tooth pitch and a larger second tooth pitch.

21 Claims, 7 Drawing Sheets

(56) References Cited

U.S. PATENT DOCUMENTS

| | | | |
|---|---|---|---|
| 7,568,416 B2 | 8/2009 | Tsujimoto | |
| 7,806,033 B2 | 10/2010 | Kocher et al. | |
| 8,210,081 B2 | 7/2012 | Elliston et al. | |
| 9,199,321 B2 | 12/2015 | Novak et al. | |
| 9,248,518 B2 | 2/2016 | Elliston et al. | |
| 2002/0184981 A1* | 12/2002 | Tsujimoto | B23D 55/088 83/13 |
| 2003/0051593 A1 | 3/2003 | Kocher et al. | |
| 2008/0307936 A1 | 12/2008 | Elliston et al. | |
| 2009/0013847 A1 | 1/2009 | Lauzet | |
| 2011/0154970 A1* | 6/2011 | Oshibe | B23D 61/121 83/835 |
| 2011/0259168 A1* | 10/2011 | Butzen | B23D 61/121 83/835 |
| 2011/0271815 A1 | 11/2011 | Elliston et al. | |
| 2012/0090443 A1* | 4/2012 | Butzen | B23D 61/121 83/849 |
| 2013/0032014 A1 | 2/2013 | Elliston et al. | |

OTHER PUBLICATIONS

Chariot, David—Communication Pursuant to Article 94(3) EPC—Aug. 23, 2018—7 pages—Netherlands.
DE102012201364A1—Machine Translation.

* cited by examiner

RECIPROCATING SAW BLADE

RELATED APPLICATION

This application claims priority, under 35 U.S.C. § 119(e), to U.S. Provisional Patent Application No. 62/249,585, filed Nov. 2, 2015, which is incorporated by reference.

TECHNICAL FIELD

This application relates to reciprocating saw blades for use with powered reciprocating saws.

BACKGROUND

Reciprocating saw blades for use with powered reciprocating saws are known. Such saw blades generally have an elongated body with a cutting edge having a plurality of teeth and gullets and a tang or shanking portion for coupling to a powered reciprocating saw. An example of such a reciprocating saw blade is the DEWALT DW4802 6-Inch 6 TPI Bi-Metal Reciprocating Saw Blade sold by DEWALT Industrial Tool Co. With the advent of more cordless (battery powered) reciprocating saws, there is a need for reciprocating saw blades that have been optimized to enhance runtime of the cordless reciprocating saw (i.e., the number of cuts that can be performed on a single battery charge). There is also a need for reciprocating saw blades that reduce the amount of vibration, improve life, and have reduced tooth wear.

SUMMARY

This application is related to reciprocating saw blades that have been optimized to reduce vibration, improve life, reduce tooth wear, and enhance runtime when being used with a cordless (battery-operated) reciprocating saw. Runtime, as used herein, refers to the number of cuts that can be performed on a single battery charge using a cordless reciprocating saw together with the reciprocating saw blades of the present application.

In an aspect, a reciprocating saw blade includes an elongated body having a front end portion and a rear end portion. An elongated cutting edge extends from the front end portion to the rear end portion and defines a longitudinal axis. An opposite non-cutting back edge extending from the front end portion to the rear end portion. The body has a thickness of approximately 0.89 mm to approximately 1.15 mm. A tang coupled to the rear end portion is configured to be coupled to a tool holder of a powered reciprocating saw. The cutting edge comprises a plurality of teeth and gullets. The teeth have a kerf width of approximately 1.29 mm to approximately 1.56 mm and are arranged in a pattern of alternating tooth pitch of a smaller first tooth pitch and a larger second tooth pitch.

Implementations of this aspect may include one or more of the following features. The teeth may have a rake angle from approximately 0° to approximately 10°. The teeth may have a positive rake angle, e.g., approximately 5° to approximately 15°. The gullets may alternate between a first gullet having a smaller first radius and a second gullet having a larger second radius. The first gullet may have a radius of approximately 0.8 mm to approximately 1.4 mm. The second gullet may have a radius of approximately 1.0 to approximately 2.0. The first tooth pitch may be approximately 4 TPI to approximately 5 TPI. The second tooth pitch may be approximately 6 TPI to approximately 8 TPI. The tang may be disposed at a cant angle of approximately 3° or less relative to the longitudinal axis. The teeth each may have a back angle of approximately 30° to approximately 40°. The teeth each may have a smaller first back angle closer to a tip of the tooth, and a larger back angle closer to the gullet. The first back angle may be approximately 20° to approximately 30° and the second back angle may be approximately 35° to approximately 45°. Some of the teeth may be set left, some of the teeth are set right, and some of the teeth are unset. The teeth may be set in an unset-left-left-right-right pattern. The reciprocating blade may improve cordless runtime by at least 6% to 7% as compared to existing reciprocating saw blades.

Advantages may include one or more of the following. The reciprocating saw blade of the present disclosure greatly reduces vibration, improves life, reduces tooth wear, and improves cordless runtime, while preserving both the speed and quality of cuts as compared to existing reciprocating saw blades. These and other advantages and features will be apparent from the description, the drawings, and the claims.

DETAILED DESCRIPTION

Figure 1:
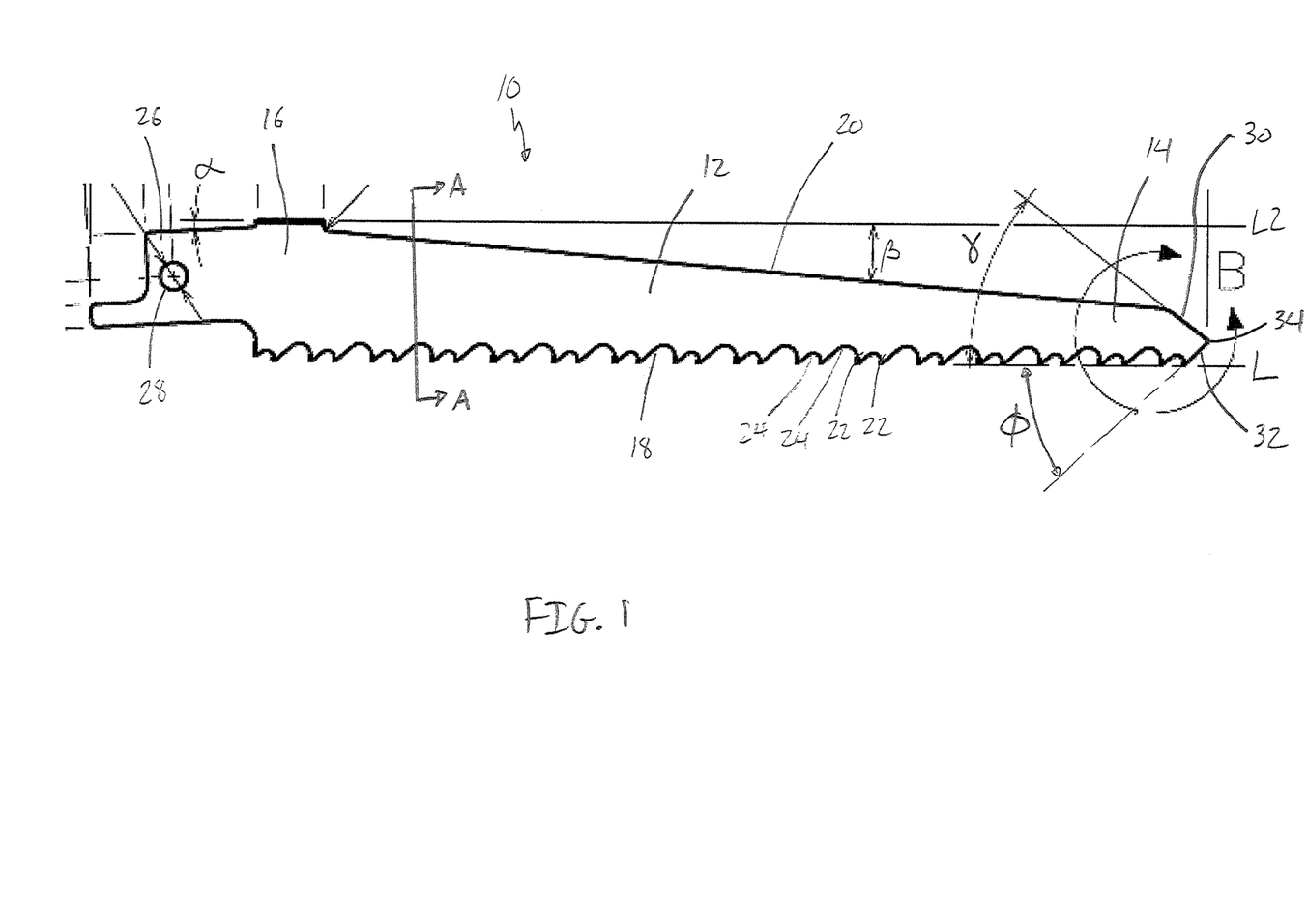
FIG. 1 is a side view of an exemplary reciprocating saw blade.
Figure 2:
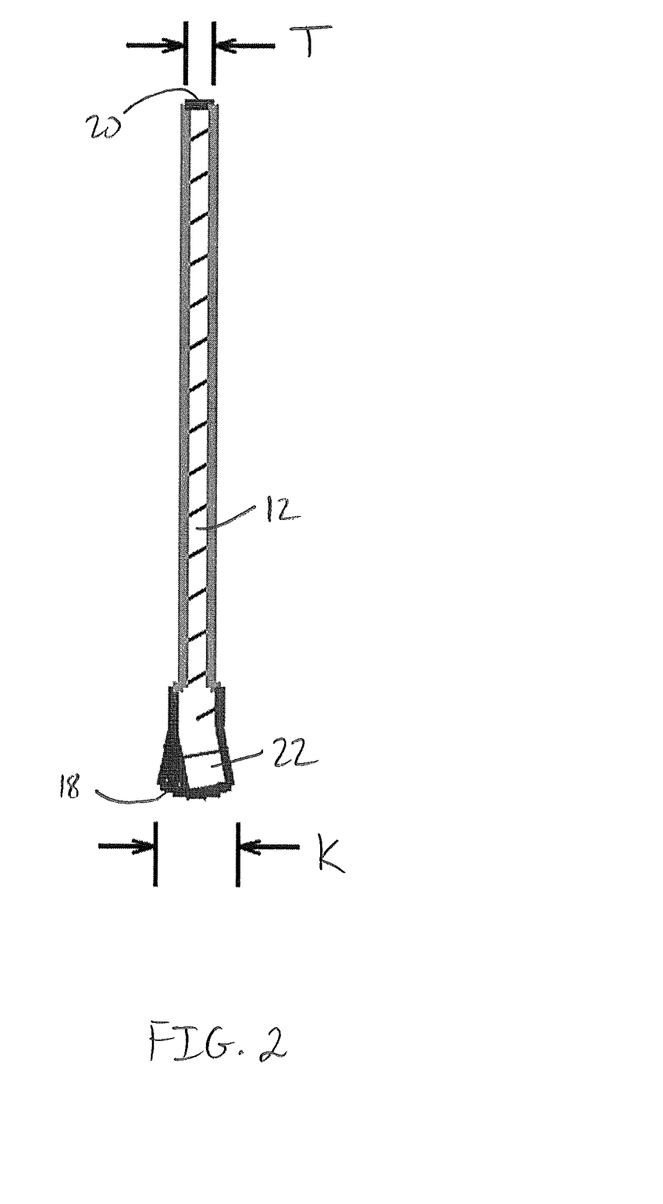
FIG. 2 is a cross-sectional view of the saw blade of FIG. 1 along line A-A.

Referring to FIGS. 1 and 2, in an exemplary embodiment, a reciprocating saw blade 10 optimized for use with a cordless reciprocating saw to maximize cordless runtime is disclosed. The saw blade 10 includes an elongated body 12 having a front end portion 14 and a rear end portion 16. An elongated cutting edge 18 extends between the front end portion 14 and the rear end portion 16. The cutting edge 18 includes a plurality of teeth 22 and gullets 24, with the tips of the teeth aligned along a longitudinal axis L. An opposite elongated back edge 20 also extends from the front end portion 14 to the rear end portion 16. The back edge 20 is disposed at an acute back edge angle β relative to a line L2 parallel to the longitudinal axis L, and thus also to the longitudinal axis L. The back edge angle β may be approximately 10° or less, e.g., approximately 5°. In order to enhance cordless runtime, the body 12 may have a thickness T that is reduced as compared to existing reciprocating saw blades. For example, the thickness T may be approximately 0.89 mm to approximately 1.15 mm, e.g., approximately 1.07 mm.

The front end portion 14 includes a top front edge 30 extending at an angle from the back edge 20 and a bottom front edge 32 extending at an angle from the cutting edge 18. The top front edge 30 and the bottom front edge 32 intersect at a leading point 34. In some embodiments, the leading point 34 may comprise a sharp point or cutting edge that facilitates entry of the saw blade into a workpiece. In other embodiments, the leading point 34 may comprise a blunt edge. The top front edge 30 is disposed at an angle y relative to the longitudinal axis L of approximately 35° to approximately 45°, e.g., approximately 39°. The bottom front edge 32 is disposed at an angle Φ relative to the longitudinal axis L of approximately 40° to approximately 50°, e.g., approximately 45°.

An L-shaped tang 26 with a central opening 28 is coupled to the rear end portion 16. The tang 26 is configured to be coupled to a tool holder of a powered reciprocating saw. The tang 26 is disposed at an acute cant angle a to the line L2 parallel to the longitudinal axis L, and thus also to the longitudinal axis L. In order to reduce vibration, the cant angle a may be reduced as compared to existing reciprocating saw blades. For example, cant angle a may be less than or equal to approximately 10°, e.g., approximately 3° to 6°.

Figure 3A:
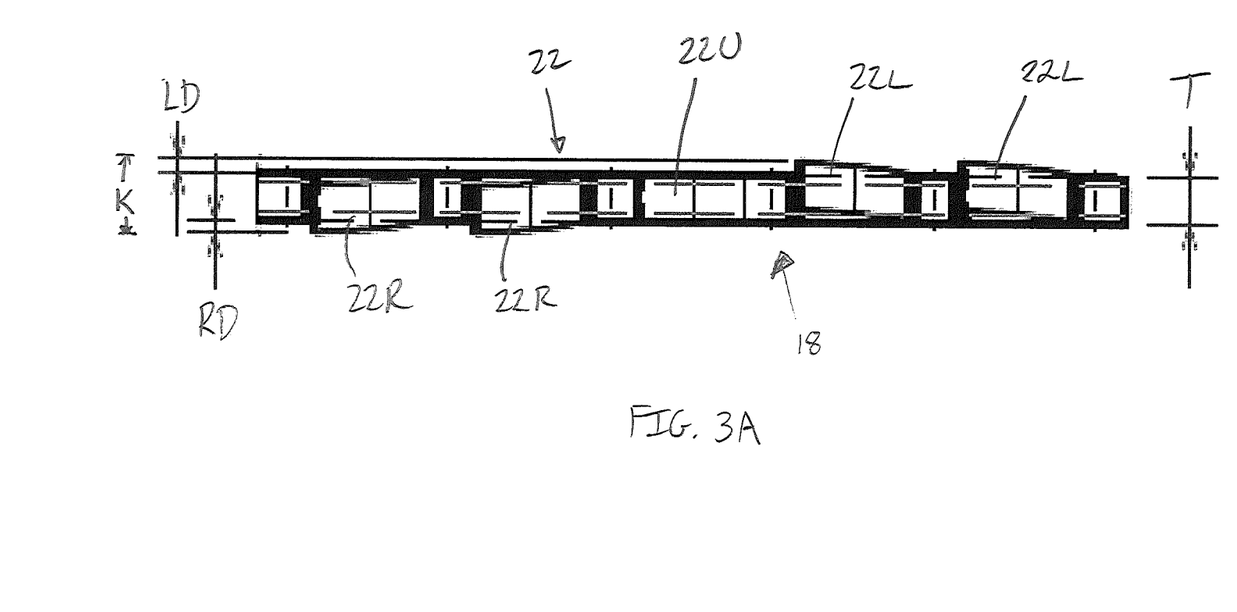
FIG. 3A is a close up end view of a portion the teeth of the saw blade of FIG. 1 showing the set pattern.
Figure 3B:
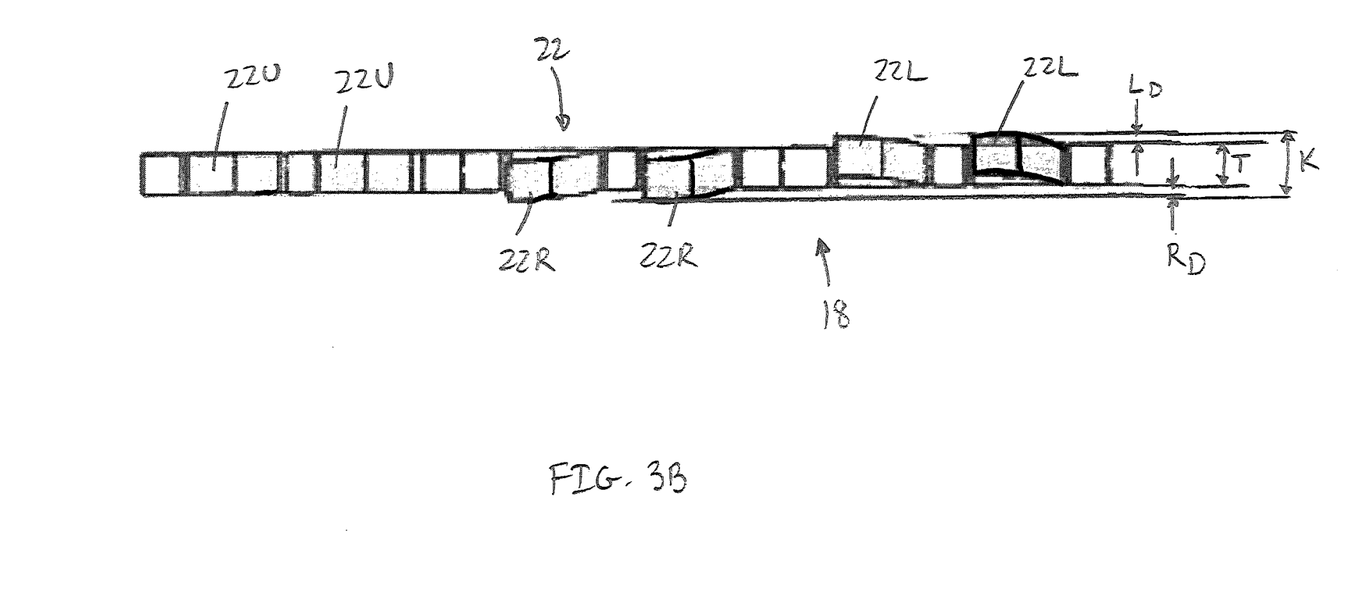
FIG. 3B is a close up end view of a portion the teeth of the saw blade of FIG. 1 showing the set pattern.

Referring also to FIGS. 3A and 3B, in order to enhance cordless runtime and reduce vibration, some of the teeth 22 are left set teeth 22L, some of the teeth 22 are right set teeth 22R, and some of the teeth 22 are unset (or raker) teeth 22U. The left set teeth 22L may be set to the left side of the blade by a left distance LD of approximately 0.1 mm to approximately 0.25 mm, e.g., approximately 0.2 mm. The right set teeth 22R may be set to the right side of the blade by a right distance RD of approximately 0.1 mm to approximately 0.25 mm, e.g., approximately 0.2 mm. The set amount of the left teeth 22L and the right teeth 22R may be the same or different than each other. The sum of the blade thickness T, the left distance LD, and the right distance RD define a kerf width K, which is the width of material removed from a workpiece by the teeth 22. To enhance cordless runtime, the kerf width K may be reduced as compared to existing reciprocating saw blades, e.g., such as approximately 1.29 mm to approximately 1.56 mm, e.g., approximately 1.47 mm. In the embodiment of FIG. 3A, the set pattern of the teeth 22 is unset-left-left-right-right. In the embodiment of FIG. 3B, the set pattern of the teeth 22 is unset-unset-left-left-right-right. However, various other set patterns are possible, such as unset-left-right, or unset-left-unset-right.

Figure 4A:
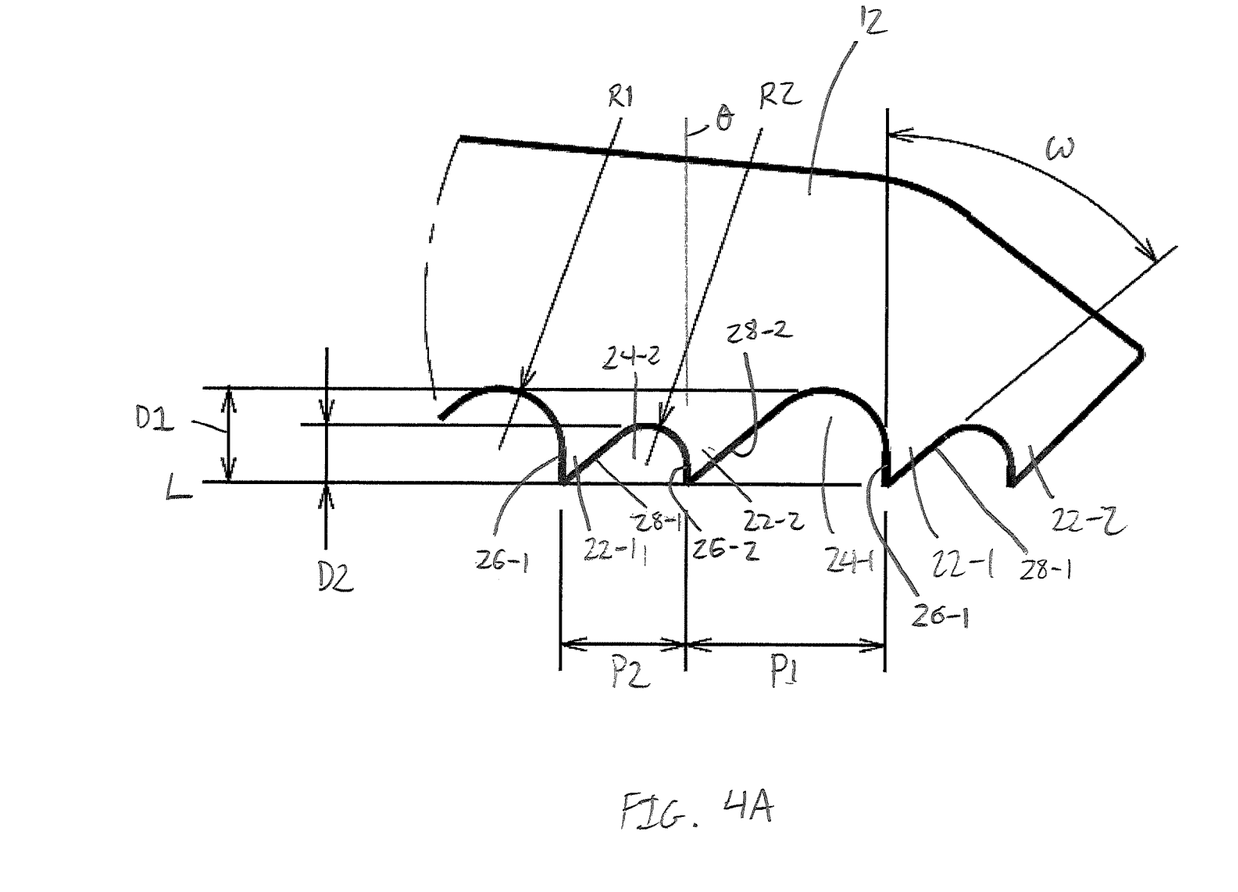
FIG. 4A is a close-up side view of a first embodiment of the teeth and front end portion of the saw blade of FIG. 1 as identified at circle B.
Figure 4B:
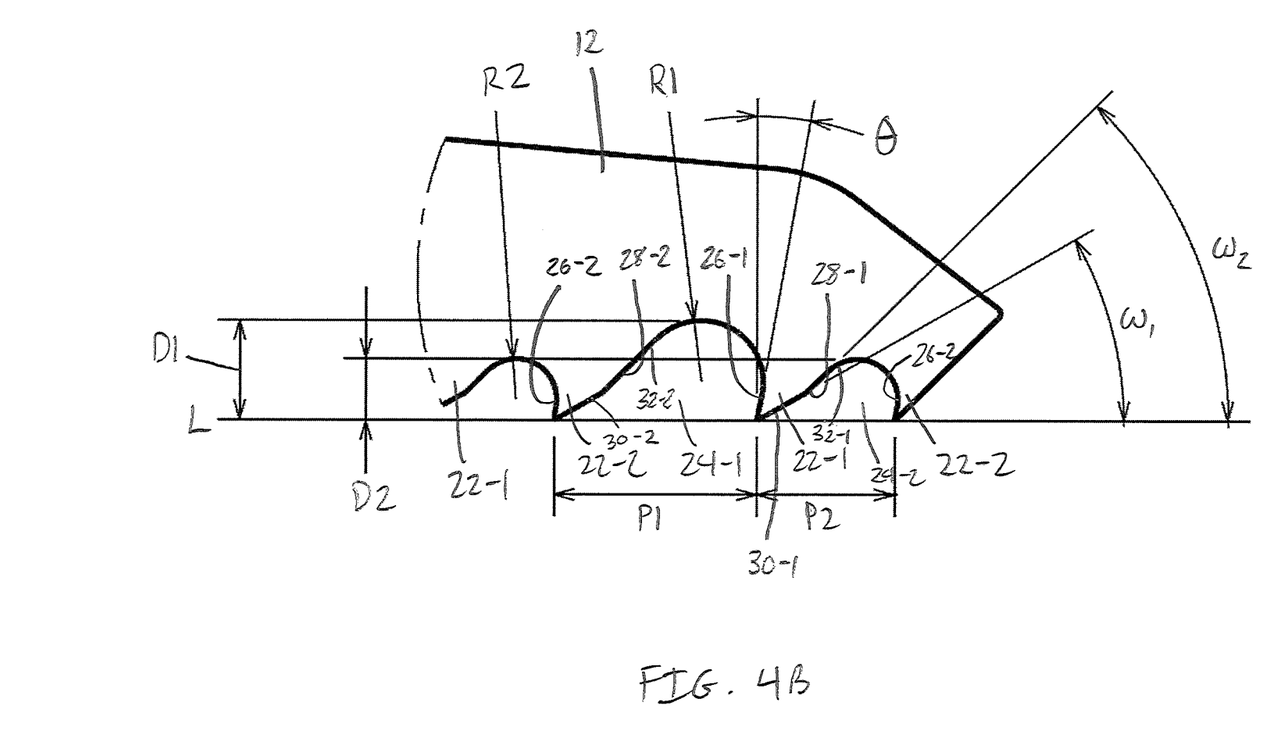
FIG. 4B is a close-up side view of a second embodiment of the teeth and front end portion of the saw blade of FIG. 1 as identified at circle B.
Figure 4C:
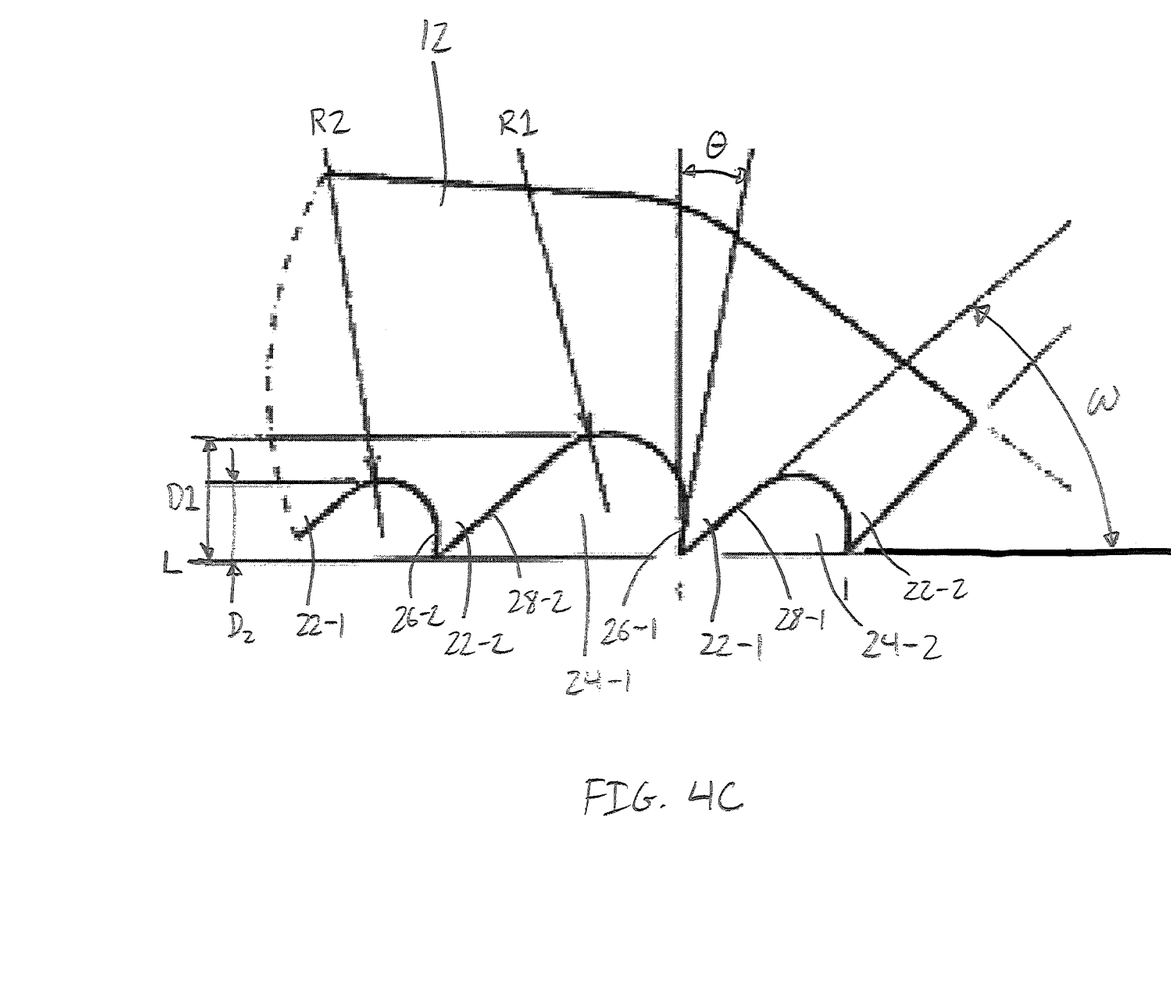
FIG. 4C is a close-up side view of a third embodiment of the teeth and front end portion of the saw blade of FIG. 1 as identified at circle B.

Referring also to FIGS. 4A-4C, the geometry and dimensions of the teeth 22 and gullets 24 may be optimized in order to improve cordless runtime, reduce vibration, improve life, and decrease tooth wear. FIGS. 4A-4C illustrate three possible geometries and dimensions for the teeth 22 and gullets 24. In FIGS. 4A-4C, like reference numbers refer to like parts.

First, to optimize cordless runtime, the teeth 22 may be arranged in a pattern alternating tooth pitch between a first tooth 22-1 and a second tooth 22-2. Tooth pitch is the number of teeth in a given length of blade (e.g., teeth per inch or TPI), so that a space P1 between teeth at the smaller first tooth pitch are longer than a space P2 between teeth at the larger second tooth pitch. As illustrated, a first tooth 22-1 and the second consecutive tooth. 22-2 in the pattern are spaced apart by the longer first distance P1 resulting in a smaller first tooth pitch, and the second tooth 22-2 and the next first consecutive tooth 22-1 are spaced apart by the smaller second distance P2 resulting in a larger second tooth pitch. This pattern repeats in an alternating pattern over the length of the cutting edge 18. For example, the distance P1 may be approximately 5.0 to approximately 7.0 mm (e.g., approximately 6.4 mm) and the first tooth pitch may be approximately 4 TPI to approximately 5 TPI (e.g., approximately 4 TPI), while the second distance P2 may be approximately 3.1 mm to approximately 5.0 mm (e.g., approximately 4.2 mm) and the second tooth pitch may be approximately 6 TPI to approximately 8 TPI (e.g., approximately 6 TPI). In addition, the teeth or the overall blade may be coated with a known coating, such as PVD coating, in order to improve life and reduce tooth wear.

Second, the gullets 24 alternate between a first gullet 24-1 between the first tooth 22-22-1 and the next consecutive second tooth 22-2 (separated by the first distance P1) and a second gullet 24-2 between a second tooth 22-2 and the next consecutive first tooth 22-1 (separated by the second distance P2). The first gullet 24-1 has a first radius R1 and a first depth D1 that are larger than a second radius R2 and a second depth D2 of the second gullet 24-2. For example, the first radius R1 may be approximately 1.0 mm to approximately 2.4 mm (e.g., approximately 2.0 mm) and the first depth D1 may be approximately 2.4 mm to approximately 3.6 mm (e.g., approximately 3.2 mm), while the second radius R2 may be approximately 0.8 mm to approximately 1.8 mm (e.g., approximately 1.4 mm) and the second depth D2 may be approximately 1.5 mm to approximately 2.5 mm (e.g., approximately 2.0 mm). It is believed that the larger first gullets 24-1 may enhance chip clearance, while the smaller second gullets 24-2 may enhance cutting speed, resulting in greater cordless runtime.

Third, each tooth has a cutting or rake edge 26-1, 26-2 at a rake angle θ measured relative to a line P perpendicular to the longitudinal axis L. Each tooth also has a relief edge 28-1, 28-2 at a back angle ω measured relative to the longitudinal axis. In the embodiment of FIG. 4A, the rake angle θ is zero and the back angle ω is approximately 30° to approximately 40°. In the embodiment of FIG. 4B, the rake angle θ may be positive, such as approximately +5° to approximately +15° (e.g., approximately)+10°. The back edges 28-1, 28-2 each have a first portion 30-1, 30-2 closer to the tooth point and a second portion 32-1, 32-2 closer to the gullet. The first portions 30-1, 30-2 each have a first smaller back angle ω1 (e.g., approximately 20° to approximately 30°) and the second portions 32-1, 32-2 each have a second larger back angle ω2 (e.g., approximately 35° to approximately 45°). In the embodiment of FIG. 4C, the rake angle θ is positive such as approximately +5° to approximately +15° (e.g., approximately +10°), and the back angle ω is approximately 35° to approximately 45° (e.g., approximately 40°). It should be understood that the positive rake angles of FIGS. 4B or 4C may be combined with the single back angles of FIG. 4A and 4C and/or that the zero rake angle of FIG. 4A may be combined the dual back angle of FIG. 4B.

Various samples of reciprocating blades having a 5/8 variable TPI, a reduced blade thickness, and a rake angle between 0° and 10°, in accordance with the present disclosure, were tested against DEWALT DW4802 Reciprocating Saw Blade to determine the cordless runtime. The blades were used to make cuts through 2×10 samples of southern yellow pine using a DEWALT 60V MAX Cordless Reciprocating Saw, with 0 pounds of bias placed on the tool. The test determined the number of cuts that could be made on a single battery charge. The following table shows the results of these tests:

| Sample | Tang Cant Angle α | Kerf Width K (mm) | Blade Thickness T (mm) | Tooth Set LS/RS (mm) | Tooth Pitch P1/P2 (TPI) | Rake Angle θ | Gullet Radius R1/R2 (mm) | Back Angle ω | Cuts Per Charge | % Improve |
|---|---|---|---|---|---|---|---|---|---|---|
| DW4802 | 6° | 1.93 | 1.27 | 0.33 | 6 | 0° | 1.5 | 20/35° | 68.0 | — |
| C | 3° | 1.47 | 1.07 | 0.2 | 5/8 | 10° | 1.2/0.8 | 35° | 72.3 | 6.4% |
| B | 3° | 1.47 | 1.07 | 0.2 | 5/8 | 0° | 1.2/0.8 | 40° | 72.0 | 5.9% |
| A | 3° | 1.29 | 0.89 | 0.2 | 5/8 | 0° | 1.2/0.8 | 35° | 72.7 | 6.9% |

As seen in the above table, each of the tested prototypes A, B, and C have somewhat improved cordless runtime (e.g., approximately 6% to 7%) as compared with the DW 4802 reciprocating saw blade.

In addition, samples of reciprocating blades having a 4/6 variable TPI, a reduced blade thickness, and a rake angle of approximately 10° in accordance with the present disclosure, were tested against the DEWALT DW4802 Reciprocating Saw Blade to determine the cordless runtime. The blades were used to make cuts through two stacked pieces of ¾"×10" samples of particle board using a DEWALT 60V MAX Cordless Reciprocating Saw, with 10 pounds of bias placed on the tool. The test determined the average speed of a single cut in seconds and the number of cuts that could be made on a single battery charge. The following table shows the results of these tests:

| Sample | Tang Cant Angle α | Kerf Width K (mm) | Blade Thickness T (mm) | Tooth Set LS/RS (mm) | Tooth Pitch P1/P2 (TPI) | Rake Angle θ | Gullet Radius R1/R2 (mm) | Back Angle ω | Speed Per Cut (sec) | Cuts Per Charge | % Improve |
|---|---|---|---|---|---|---|---|---|---|---|---|
| DW4802 | 6° | 1.93 | 1.27 | 0.33 | 6 | 0° | 1.5 | 20/35° | 10.8 | 46.2 | — |
| Present Application | 6° | 1.47 | 1.07 | 0.2 | 4/6 | 10° | 2.0/1.4 | 40° | 7.6 | 61.2 | 32% |

As seen in the above table, the tested blades of the present invention have significantly improved cutting speed and cordless runtime (e.g., approximately 32%) as compared with the DEWALT DW 4802 reciprocating saw blade. Based on the above test results, it is believed that the cordless runtime is enhanced and vibration is reduced with a reciprocating saw blade having a reduced blade thickness (e.g., approximately 0.89 to approximately 1.15 mm), a reduced kerf width (e.g., approximately 1.29 mm to approximately 1.56 mm), and an alternating tooth pitch (e.g., approximately 5/8 TPI or 4/6 TPI), and a positive rake angle (e.g., approximately 5° to approximately 15°).

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this disclosure.

The invention claimed is:

1. A reciprocating saw blade comprising:
    an elongated body having a front end portion, a rear end portion, an elongated cutting edge extending from the front end portion to the rear end portion and defining a longitudinal axis, and an opposite non-cutting back edge extending from the front end portion to the rear end portion, the body having a thickness of approximately 0.89 mm to approximately 1.15 mm; and
    a tang coupled to the rear end portion, the tang being configured to be coupled to a tool holder of a powered reciprocating saw,
    wherein the cutting edge comprises a plurality of teeth and gullets, the teeth having straight side faces, a kerf width from approximately 1.29 mm to approximately 1.56 mm and being arranged in a pattern of alternating tooth pitch of a smaller first tooth pitch and a larger second tooth pitch, each tooth having a zero or positive rake angle.

2. The reciprocating saw blade of claim 1, wherein the positive rake angle is between approximately 5° and approximately 15°.

3. The reciprocating saw blade of claim 1, wherein the gullets alternate between a first gullet having a smaller first radius and a second gullet having a larger second radius.

4. The reciprocating saw blade of claim 3, wherein the first gullet has a radius of approximately 0.8 mm to approximately 1.4 mm.

5. The reciprocating saw blade of claim 4, wherein the second gullet has a radius of approximately 1.0 mm to approximately 2.0 mm.

6. The reciprocating saw blade of claim 1, wherein the first tooth pitch is approximately 4 TPI to approximately 5 TPI.

7. The reciprocating saw blade of claim 6, wherein the second tooth pitch is approximately 6 TPI to approximately 8 TPI.

8. The reciprocating saw blade of claim 1, wherein the tang is disposed at a cant angle of approximately 3° to 6° relative to the longitudinal axis.

9. The reciprocating saw blade of claim 1, wherein the teeth each have a back angle of approximately 30° to approximately 40°.

10. The reciprocating saw blade of claim 1, wherein the teeth each have a smaller first back angle closer to a tip of the tooth, and a larger back angle closer to the gullet.

11. The reciprocating saw of claim 10, wherein the first back angle is approximately 20° to approximately 30° and the second back angle is approximately 35° to approximately 45°.

12. The reciprocating saw blade of claim 11, wherein some of the teeth are set left, some of the teeth are set right, and some of the teeth are unset.

13. The reciprocating saw blade of claim 12, wherein the teeth are set in an unset-left-left-right-right pattern.

14. The reciprocating saw blade of claim 12, wherein the teeth are set in an unset-unset-left-left-right-right pattern.

15. The reciprocating saw blade of claim 1, wherein the reciprocating saw blade enables use in a cordless reciprocating saw to have a runtime improvement of at least 30% as compared to a reciprocating saw blade with a blade thickness of at least 1.9 mm, a zero degree rake angle, and a constant tooth pitch.

16. A reciprocating saw blade comprising:
    an elongated body having a front end portion, a rear end portion, an elongated cutting edge extending from the front end portion to the rear end portion and defining a longitudinal axis, and an opposite non-cutting back edge extending from the front end portion to the rear end portion, the body having a thickness of approximately 0.89 mm to approximately 1.15 mm; and
    a tang coupled to the rear end portion, the tang being configured to be coupled to a tool holder of a powered reciprocating saw,
    wherein the cutting edge comprises a plurality of teeth and gullets, the teeth having a kerf width from approximately 1.29 mm to approximately 1.56 mm, each tooth having a positive rake angle between approximately 5° and approximately 15°, the teeth being arranged in a pattern of alternating tooth pitch of a smaller first tooth pitch of approximately 4 TPI to 5 TPI and a larger second tooth pitch of approximately 6 TPI to approximately 8 TPI, the gullets
    alternating between a first gullet having a smaller first radius of approximately 0.8 mm to approximately 1.4 mm and a second gullet having a larger second radius of approximately 1.0 to approximately 2.0, and the teeth being set in a pattern of left set teeth, right set teeth, and unset teeth.

17. The reciprocating saw blade of claim 16, wherein the teeth are set in an unset-left-left-right-right pattern.

18. The reciprocating saw blade of claim 16, wherein the teeth are set in an unset-unset-left-left-right-right pattern.

19. The reciprocating saw blade of claim 16, wherein the reciprocating saw blade enables use in a cordless reciprocating saw to have a runtime improvement of at least 30% as compared to a reciprocating saw blade with a blade thickness of at least 1.9 mm, a zero degree rake angle, and a constant tooth pitch.

20. The reciprocating saw blade of claim 1, wherein the teeth have tips that are aligned along an axis parallel to a longitudinal axis of the body.

21. The reciprocating saw blade of claim 16, wherein the teeth have tips that are aligned along an axis parallel to a longitudinal axis of the body.

* * * * *